(12) United States Patent
Hara et al.

(10) Patent No.: US 10,995,228 B2
(45) Date of Patent: May 4, 2021

(54) HOLLOW STRUCTURE PARTICLES, METHOD FOR PRODUCING SAME AND WHITE INK

(71) Applicant: Nippon Kayaku Kabushiki Kaisha, Tokyo (JP)

(72) Inventors: Yukihiro Hara, Tokyo (JP); Akihiro Nohara, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/609,589

(22) PCT Filed: May 8, 2018

(86) PCT No.: PCT/JP2018/017705
§ 371 (c)(1),
(2) Date: Oct. 30, 2019

(87) PCT Pub. No.: WO2018/207751
PCT Pub. Date: Nov. 15, 2018

(65) Prior Publication Data
US 2020/0056060 A1 Feb. 20, 2020

(30) Foreign Application Priority Data
May 11, 2017 (JP) .............................. JP2017-094319

(51) Int. Cl.
| | | |
|---|---|---|
| B41J 2/21 | (2006.01) | |
| C09D 11/322 | (2014.01) | |
| C09D 11/037 | (2014.01) | |
| C09C 1/36 | (2006.01) | |
| B01J 13/04 | (2006.01) | |
| B41M 5/00 | (2006.01) | |

(52) U.S. Cl.
CPC ............. *C09D 11/322* (2013.01); *B01J 13/04* (2013.01); *B41J 2/2117* (2013.01); *B41M 5/0023* (2013.01); *C09C 1/363* (2013.01); *C09C 1/3661* (2013.01); *C09C 1/3692* (2013.01); *C09D 11/037* (2013.01); *C01P 2004/34* (2013.01); *C01P 2004/61* (2013.01); *C01P 2004/62* (2013.01); *C01P 2004/64* (2013.01); *C01P 2004/84* (2013.01); *C01P 2006/60* (2013.01)

(58) Field of Classification Search
CPC ...... B41J 2/2117; B41M 5/00; B41M 5/0023; B01J 13/04; B01J 13/14; B01J 13/203; B01J 13/206; C04B 35/462; C04B 38/009; C04B 38/067; C09C 1/363; C09C 1/3661; C09C 1/3692; C09D 11/037; C09D 11/322; C01G 23/04; C01G 23/047; C01P 2004/34; C01P 2004/60; C01P 2004/61; C01P 2004/62; C01P 2004/64; C01P 2004/84
See application file for complete search history.

(56) References Cited

U.S. PATENT DOCUMENTS

| | | | | |
|---|---|---|---|---|
| 6,358,495 B1 * | 3/2002 | Nishihama | ............... | A61K 8/25 424/59 |
| 2006/0243947 A1 * | 11/2006 | Tsumura | ............... | C08F 290/06 252/299.01 |
| 2006/0275606 A1 * | 12/2006 | Mizutani | ............... | C09D 11/322 428/404 |
| 2007/0259986 A1 * | 11/2007 | Elwakil | ............... | C09D 11/101 522/83 |
| 2008/0131614 A1 * | 6/2008 | Oriakhi | ............... | C09D 11/322 427/466 |
| 2012/0302676 A1 * | 11/2012 | Oya | ........................ | C08J 5/18 524/89 |

FOREIGN PATENT DOCUMENTS

| | | | |
|---|---|---|---|
| CN | 104671282 | A | 6/2015 |
| CN | 104046117 | B | 7/2016 |
| JP | H05-138009 | A | 6/1993 |
| JP | H06-142491 | A | 5/1994 |
| JP | H06-330606 | A | 11/1994 |
| JP | 2006-307125 | A | 11/2006 |
| JP | 2008-074645 | A | 4/2008 |
| JP | 2009-298614 | A | 12/2009 |
| JP | 2013-023676 | A | 2/2013 |

OTHER PUBLICATIONS

Supplementary European Search Report in European Patent Application No. 18798808.4, dated Jan. 17, 2020.
Proceedings of the Meeting of the Society of Powder Technology, Japan, vol. 2011, pp. 25-26 (2011).
Peng at al., "General Synthesis and Optical Properties of Monodisperse Multifunctional Metal-Ion-Doped TiO2 Hollow Particles", J. Phys. Chem. C, 113, 20240-20245 (2009).
Song, X. et al., "Fabrication of Hollow Hybrid Microspheres Coated with Silica/ Titania via Sol-Gel Process and Enhanced Photocatalytic Activities", J. Phys. Chem. C, May 16, 2007, vol. 111, pp. 8180-8187, ISSN 1932-7447, in particular, Introduction, Preparation of Hollow Si02/Ti02 Double-Shell Hybrid Microspheres and Doping Nitrogen Procedure., XRD Analysis., fig 4.

* cited by examiner

Primary Examiner — Anh T Vo
(74) Attorney, Agent, or Firm — Knobbe Martens Olson & Bear LLP

(57) ABSTRACT

Hollow structure particles which contain titanium oxide and silica, in which the crystal type of the titanium oxide is rutile type; a method for producing the hollow structure particles; a white ink which contains these hollow structure particles as a coloring agent; use of the white ink in inkjet recording; and an inkjet recording method which uses the white ink.

19 Claims, No Drawings

HOLLOW STRUCTURE PARTICLES, METHOD FOR PRODUCING SAME AND WHITE INK

This application is the U.S. National Phase under 35 U.S.C. § 371 of International Application PCT/JP2018/017705, filed May 8, 2018, designating the U.S., and published in Japanese as WO 2018/207751 on Nov. 15, 2018 which claims priority to Japanese Patent Application No. 2017-094319, filed May 11, 2017, the entire contents of which are incorporated herein by reference.

TECHNICAL FIELD

The present invention relates to hollow structure particles, a method of producing the same, and a white ink containing the hollow structure particles as a coloring agent.

BACKGROUND ART

A hollow structure particle is a particulate having a hollow cavity therein. Conventionally, hollow structure particles have been widely used as a microcapsule in which various functional substances are contained in a hollow cavity. Since hollow structure particles have light scattering properties caused by a hollow cavity, they are used as a light scattering agent or a light scattering assistant which imparts performances such as shininess, glossiness, opacity, whiteness, etc. to inks, paints, cosmetics, and coating agents and the like for papers, fibers, leathers, glasses, metals, etc. Further, hollow structure particles are also expected to be used as a refractive index adjusting agent, a weight reducing agent, a sound insulating material, a heat insulating material and the like.

Among hollow structure particles, those comprising metallic oxides such as silica, titanium oxide and zirconium oxide, etc. are expected to be applied as white pigments and the like because of their excellent structural stability and chemical stability (for example, see Patent Documents 1 to 4 and Non-Patent Documents 1 to 2).

For example, Patent Document 1 discloses a white ink for ink jet that contains hollow particles consisting of substantially only white metal oxide as a coloring agent.

Patent Document 1: Japanese Unexamined Patent Application, Publication No. 2013-23676
Patent Document 2: Japanese Unexamined Patent Application, Publication No. H06-330606
Patent Document 3: Japanese Unexamined Patent Application, Publication No. H05-138009
Patent Document 4: Japanese Unexamined Patent Application, Publication No. H06-142491
Non-Patent Document 1: Proceedings of the Meeting of the Society of Powder Technology, Japan, vol. 2011, 2011, pp. 25-26
Non-Patent Document 2: J. Phys. Chem. C 2009, 113, 20240-20245

DISCLOSURE OF THE INVENTION

Problems to be Solved by the Invention

White inks are useful for marking industrial products such as plastics because printing letters on a surface to be printed with a low lightness such as black or the like results in a recorded material with excellent visibility. White inks (aqueous inks, latex inks, solvent inks, ultraviolet curable inks, etc.) are widely used for the purpose of, for example, forming a white base in textile printing, forming a white base on a transparent medium (in particular, a film formed of a transparent resin, etc.). When a recorded image is formed by color inks without forming a white base on a transparent medium, light passes through the recorded image, so that chromogenic properties or the like tend to be poor. For this reason, it is common practice to form a recorded image with color inks after forming a white base to improve a hiding property.

As described above, hollow structure particles that contain silica or a metallic oxide are expected to be applied as a white pigment or the like. However, according to confirmation by the present inventors, conventional hollow structure particles have room for improvement in particle strength or hiding property and storage stability when contained as a coloring agent in a white ink.

Accordingly, it is an object of the present invention to provide a hollow structure particle having high particle strength and enabling to obtain a white ink excellent in hiding property and storage stability when contained as a coloring agent, a method of producing the same and a white ink containing the hollow structure particle as a coloring agent.

Means for Solving the Problems

As a result of intensive studies to solve the above-mentioned problems, the present inventors have completed the following inventions 1) to 14).

1) A first aspect of the present invention provides a hollow structure particle, containing titanium oxide and silica, in which the crystalline form of the titanium oxide is rutile.

2) A second aspect of the present invention provides the hollow structure particle according to the first aspect, in which primary particle diameter B is 10 nm to 1,000 nm.

3) A third aspect of the present invention provides the hollow structure particle according to the first or second aspect, in which a ratio of inner diameter A of a hollow structure to primary particle diameter B, A/B, is 0.3 to 0.95.

4) A fourth aspect of the present invention provides the hollow structure particle according to any one of the first to the third aspect, further containing an element other than titanium oxide and silica.

5) A fifth aspect of the present invention provides a method of producing a hollow structure particle, including: forming a shell containing a titanium oxide precursor on a surface of a template particle, which becomes a core, to obtain a first core/shell particle;
applying a silica precursor to a surface of the first core/shell particle to obtain a second core/shell particle;
removing the template particle from the second core/shell particle to obtain a shell particle; and
firing the shell particle to obtain the hollow structure particle according to any one of the first to fourth aspects.

6) A sixth aspect of the present invention provides a method of producing a hollow structure particle, comprising: forming a shell containing a titanium oxide precursor on a surface of a template particle which becomes a core, to obtain a first core/shell particle,
applying a silica precursor to a surface of the first core/shell particle to obtain a second core/shell particle, and
firing the second core/shell particle to remove the template particle to obtain the hollow structure particle according to any one of the first to fourth aspects.

7) A seventh aspect of the present invention provides the method of producing according to the fifth or sixth aspect, in which the template particle is a polymer particle.

8) An eighth aspect of the present invention provides the method of producing according to the fifth or sixth aspect, in which the template particle is a polymer particle containing styrene as a constituent monomer.

9) A ninth aspect of the present invention provides the method of producing according to the fifth or sixth aspect, in which the template particle is a styrene-(meth)acrylic acid polymer particle.

10) A tenth aspect of the present invention provides the method of producing according to the fifth or sixth aspect, in which the step of obtaining the second core/shell particle is performed in the presence of a dispersant.

11) An eleventh aspect of the present invention provides a white ink containing the hollow structure particle according to any one of the first to fourth aspects as a coloring agent.

12) A twelfth aspect of the present invention provides the white ink according to the eleventh aspect, in which the white ink is an ink selected from the group consisting of aqueous inks, latex inks, solvent inks and ultraviolet curable inks.

13) A thirteenth aspect of the present invention provides use of the white ink according to the eleventh or twelfth aspect in inkjet recording.

14) A fourteenth aspect of the present invention provides an inkjet recording method, in which recording is performed by ejecting droplets of the white ink according to the eleventh or twelfth aspect by using an ink jet printer, so that the droplets are attached to a recording medium.

Effects of the Invention

According to the present invention, it is possible to provide a hollow structure particle having high particle strength and enabling to obtain a white ink excellent in hiding property and storage stability when contained as a coloring agent, a method of producing the same and a white ink containing the hollow structure particle as a coloring agent.

PREFERRED MODE FOR CARRYING OUT THE INVENTION

<Hollow Structure Particles>

The hollow structure particle according to the present embodiment is a hollow structure particle that contains titanium oxide and silica, and the crystalline form of the titanium oxide is rutile. A hollow cavity is formed inside the hollow structure particle. The particle shape of the hollow structure particle is not particularly limited, and examples of the particle shape include a spherical shape, a concavoconvex shape, an irregular shape, or the like. Among these, spherical particles are preferable.

Since the hollow structure particle according to the present embodiment has the above-described configuration, it tends to easily maintain a hollow-structure during production. In addition, since the hollow structure particle according to the present embodiment has the above-described configuration, it tends to be easy to produce a hollow structure particle having a uniform primary particle diameter and a small variation coefficient of the primary particle diameter.

The hollow structure particle according to the present embodiment may be a particle formed of a mixture of titanium oxide and silica, or may be a particle having a two-layer structure in which a layer of silica is formed on the surface of titanium oxide particle having a hollow structure.

The content of silica is usually from 0.1% by mass to 80% by mass, preferably from 0.5% by mass to 60% by mass, more preferably from 1% by mass to 40% by mass, even more preferably from 1% by mass to 20% by mass, particularly preferably from 1% by mass to 10% by mass, based on the content of titanium oxide. Such ranges allow to easily produce hollow structure particles, and titanium oxide also tends to easily exhibit effects thereof (e.g., UV shielding, high refractive index).

The primary particle diameter of the hollow structure particle is usually from 10 nm to 1,000 nm, preferably from 50 nm to 750 nm, more preferably from 100 nm to 700 nm, even more preferably from 150 nm to 500 nm, particularly preferably from 180 nm to 500 nm. Such ranges tend to facilitate the formation of a hollow structure. When a hollow structure particle is used as a coloring agent of white inks for ink jet recording, the primary particle diameter of the hollow structure particle is preferably 200 nm to 400 nm, more preferably 250 nm to 350 nm. Such ranges tend to improve a hiding property, storage stability, and an ejection property of the white ink.

The porosity of the hollow structure particle is expressed by the ratio of the inner diameter A of the hollow structure to the primary particle diameter B of the hollow structure particle (A/B). The ratio A/B is usually from 0.3 to 0.95, preferably from 0.3 to 0.9, more preferably from 0.4 to 0.8. Such ranges tend to increase the particle strength of the hollow structure particle.

In this specification, inner diameter A of the hollow structure and primary particle diameter B of the hollow structure particle are an arithmetic mean value of inner diameters As of the hollow structures of 10 hollow structure particles and an arithmetic mean value of primary particle diameters Bs of the 10 hollow structure particles, respectively, with the 10 hollow structure particles being randomly photographed by transmission electron microscopy (TEM). When the significant figure of the ratio A/B is one decimal place, the second decimal place is rounded off and calculated. When the significant figure of ratio A/B is two digits after the decimal point, the ratio A/B is calculated by rounding off the third decimal place.

The variation coefficient of the primary particle diameters of hollow structure particles can be calculated from the following equation.

Variation coefficient (%)=standard deviation of primary particle diameter (nm)/arithmetic mean particle diameter (nm)

A smaller variation coefficient is preferable because it indicates that particles having a uniform diameter are obtained. The variation coefficient is usually 10% or less, preferably 8% or less, more preferably 7% or less, and even more preferably 5% or less. The lower limit is preferably small, and ideally 0%.

As the crystal form of titanium oxide, anatase, rutile, and brookite are known. Among these, rutile is preferable.

The hollow structure particle according to the present embodiment may further contain an element other than titanium oxide and silica. Examples of such element include an element selected from Sn, Cd, Fe, Ni, Zn, Mn, Co, Cr, Cu, K, Na, Li, P, S and the like. These elements may be of one or two or more.

When the hollow structure particle according to the present embodiment further contains an element other than titanium oxide and silica, the total content of such an element is usually 0.1 mol % to 15 mol %, preferably 0.1 mol % to 10 mol %, more preferably 0.1 mol % to 5 mol %, based on the mol number of titanium in the titanium oxide. Such ranges tend to allow to easily obtain rutile titanium oxide, and to allow to produce less colored hollow structure particles (i.e., high whiteness).

The hollow structure particle according to the present embodiment may further have a layer of another material on its surface as required. Examples of the other material include alumina, aluminum hydroxide, zinc oxide, zinc hydroxide, zirconia, organic matter and the like.

The hollow structure particle according to the present embodiment is useful in various applications such as white pigments for white inks, or light scattering agents or light scattering assistants, etc. in cosmetics and the like. In particular, according to the hollow structure particle of the present embodiment, white inks excellent in hiding property and storage stability can be obtained.

<Process for Manufacturing Hollow Structure Particles>

The hollow structure particles according to the present embodiment can be manufactured according to a known production method described in, for example, Xiong Wen (David) Lou, Lynden A. Archer and Zichao Yang, Adv. Mater., 2008, 20, pp. 3987-4019, and the like.

Among them, a preferred production method includes a step of forming a shell containing a titanium oxide precursor on the surface of a template particle which becomes a core, to obtain a first core/shell particle; (hereinafter also referred to as a "first step"), a step of applying a silica precursor to a surface of the first core/shell particle to obtain a second core/shell particle (hereinafter also referred to as a "second step"), a step of removing the template particle from the second core/shell particle to obtain a shell particle (hereinafter also referred to as a "third step"), and a step of firing the shell particle to obtain the hollow structure particle (hereinafter also referred to as a "fourth step").

Unless otherwise specified, it is preferable to carry out the steps described below under agitation.

[Step 1]

The first step includes, for example, a step of reacting the template particle with titanium alkoxide in an organic solvent in the presence of a base. The first step allows to obtain a first core/shell particle in which a shell containing a titanium oxide precursor is formed on the surface of the template particle, which becomes a core.

Examples of the template particles include polymer particles obtained by polymerizing at least one type of monomer selected from (meth)acrylate-based, a vinyl-based, a styrene-based and a urethane-based monomer; inorganic particles such as calcium carbonate, iron oxide, cobalt oxide, manganese oxide, chromium oxide and nickel oxide; and the like. Among these, polymer particles are preferable, polymer particles containing styrene as a constituent monomer are more preferable, styrene-(meth)acrylic acid polymer particles are even more preferable, and styrene-methacrylic acid polymer particles are particularly preferable. In this specification, the term "(meth)acrylate" refers to both acrylates and methacrylates, and the term "(meth)acrylic acid" refers to both acrylic acid and methacrylic acid.

As the titanium alkoxide, titanium tetraalkoxide is preferred, titanium tetra-C1-C6-alkoxide is more preferred, and titanium tetrabutoxide is even more preferred.

By controlling the addition amount of titanium alkoxide, the thickness of shell can be controlled. Titanium alkoxide may be added at one time in an amount required to make the shell have a particular thickness, or may be added in portions of several times. The addition of titanium alkoxide in portions tends to make the shell more uniform in thickness.

Examples of organic solvents include hydrocarbon-based solvents (such as toluene, xylene, hexane, cyclohexane and n-heptane); alcohol-based solvents (such as methanol, ethanol, isopropyl alcohol, butanol, t-butanol and benzyl alcohol); ketone-based solvents (such as acetone, methyl ethyl ketone, methyl isobutyl ketone, diisobutyl ketone, cyclohexanone and acetylacetone); ester-based solvents (such as ethyl acetate, methyl acetate, butyl acetate, cellosolve acetate and amyl acetate); ether-based solvents (such as isopropyl ether, methyl cellosolve, butyl cellosolve, tetrahydrofuran and 1,4-dioxane); glycol-based solvents (such as ethylene glycol, diethylene glycol, triethylene glycol, propylene glycol and octylene glycol); glycol ether-based solvents (such as diethylene glycol monomethyl ether and propylene glycol monomethyl ether); glycol ester-based solvents (such as ethylene glycol monomethyl ether acetate, propylene glycol monomethyl ether acetate and diethylene glycol monoethyl ether acetate); glyme-based solvents (such as monoglyme and diglyme); halogen-based solvents (such as dichloromethane and chloroform); amide-based solvents (such as N,N-dimethylformamide, N,N-dimethylacetamide and N-methyl-2-pyrrolidone); pyridine, sulfolane, acetonitrile and dimethylsulfoxide; and the like.

As the organic solvent, one type may be used alone, or two or more types may be used in combination. For instance, using two or more types of organic solvents in combination and controlling the ratio, the concentration of template particles and the method of adding a base allow to carry out the first step while maintaining the dispersion state of the reaction solution in a good condition.

Examples of the base include inorganic bases and organic bases. Examples of the inorganic base include a hydroxide of an element belonging to Group 1 or Group 2 of the periodic table, preferably a hydroxide of Na, K, Ca, Mg, Al, Fe, etc.; ammonia; and the like. Examples of the organic base include heteroaromatic ring compounds such as pyridine; an alkylamine such as triethylamine (preferably trialkylamine, more preferably tri-C1-C4-alkylamine); a hydroxyalkylamine such as triethanolamine (preferably tri(hydroxyalkyl)amine, more preferably tri(hydroxy-C1-C4-alkylamine)); and the like.

The first step is preferably performed in an inert gas atmosphere such as nitrogen or argon. The reaction temperature in the first step is usually −30° C. to 80° C., preferably 0° C. to 50° C. Since the reaction time of the first step varies depending on the reaction temperature, the thickness of shell and the like, it is difficult to determine the reaction time to a particular one. The typical range therefor is about 0.1 hours to 10 hours, preferably about 0.5 hours to 7 hours.

When the template particle is a polymer particle and the sign of the surface potential thereof is the same as that of titanium oxide, the first core/shell particles may be formed by the following method. That is, an organic polymer (e.g., polyethyleneimine or the like) having a sign opposite to the sign of the above-mentioned surface potential is adsorbed onto the surface of the template particle. Then, the first core/shell particles can be formed by making fine particles of titanium oxide deposit or adsorb onto the surface of the organic polymer and adding titanium alkoxide as necessary. It is possible to make the shell preferentially have a specific crystal form by using, for instance, rutile titanium oxide as the fine particle of titanium oxide.

[Step 2]

The second step includes, for example, a method of treating the surface of the first core/shell particle with a silane alkoxide. More specifically, the method includes a method in which the second core/shell particle and a silane alkoxide are reacted in an organic solvent. The second step can yield a second core/shell particle with a silica precursor applied to the surface of the first core/shell particle. In the second core/shell particle, a surface of the first core/shell particle may be completely or partially covered with a layer of a silica precursor, depending on the application of the hollow structure particle.

As the silane alkoxide, a silane tetra alkoxide is preferred, a silane tetra-C1-C4-alkoxide is more preferred, and silane tetra ethoxide is even more preferred. Examples of the organic solvent include organic solvents the same as those indicated for the first step, including preferred organic solvents and the like.

In the first step and the second step, the reaction is performed in the state of dispersion. Therefore, the first and the second steps are preferably carried out in the presence of a dispersant in order to improve the dispersion stability of the dispersions. The type of dispersant is not particularly limited as long as it does not interfere with the formation of shell. Examples of such dispersants include, for example, polyalkylene glycols such as polyethylene glycol and polypropylene glycol; polyvinyl pyrrolidone; Flowlen series manufactured by Kyoei Chemical Co., Ltd.; DISPERBYK series manufactured by Byk Chemie Japan Co., Ltd.; Solsperse series manufactured by Nippon Lubrizole Co., Ltd.; Ajisper series manufactured by Ajinomoto Fine Techno Co., Inc.; Disparlon series manufactured by Kusumoto Chemicals Ltd.; and the like.

The second step may be performed after isolation of the first core/shell particles. Alternatively, without isolating the first core/shell particles, a silane alkoxide may be added to the reaction solution after the reaction of the first step is completed, so that the second step is carried out to obtain the second core/shell particles. From the viewpoint of convenience and economy of operation, it is preferable to perform the second step without isolating the first core/shell particles.

[Step 3]

The third step includes, for example, a step of dissolving the template particles in a solvent to remove them. As such a solvent, a solvent which does not dissolve the shell particles is preferable. When the template particles are polymer particles, examples of the organic solvent to be used in the third step include methyl ethyl ketone, toluene, tetrahydrofuran and chloroform, etc. When the template particles are inorganic particles, examples of the solvent used in the third step include aqueous solutions of acids such as a dilute hydrochloric acid, dilute nitric acid, or dilute sulfuric acid.

[Step 4]

The fourth step includes, for example, a step of obtaining hollow structure particles by firing the shell particles obtained in the third step.

Firing can be performed in an atmosphere of a gas selected from one or more of air, nitrogen, argon, hydrogen, ammonia and the like. In particular, when the content of silica in the hollow structural particles is 5 mass % or less (preferably 3.9 mass % (5 mol %) or less) with respect to the content of titanium oxide, firing can be performed in an air atmosphere. When the content of silica is more than 5 mass %, preferably 3.9 mass %, it is preferable to perform firing in a gas containing no oxygen, for example, in an atmosphere of a gas selected from one or more of nitrogen, argon, hydrogen, ammonia and the like, and then further firing in a gas containing oxygen, for example, air. Note that a "gas containing no oxygen" refers to a gas in which the content of oxygen with respect to the total amount of the gas is typically 0.5% by volume or less, preferably 0.05% by volume or less, more preferably 0.005% by volume or less, and even more preferably 0.0005% by volume or less. Firing in this manner tends to easily produce hollow structure particles in which the crystalline form of titanium oxide is rutile, whiteness and strength are high, and the variation coefficient of the primary particle diameter is low.

Since the firing temperature of the fourth step varies depending on the material and the like of the hollow structure particles, it is difficult to determine the firing temperature to a particular one. The typical range thereof is 600° C. to 1,500° C., preferably 650° C. to 1,400° C., more preferably 700° C. to 1,300° C., and even more preferably 750° C. to 1,200° C. Since the firing time of the fourth step varies depending on the firing temperature and the like, it is difficult to decide on a specific firing time. The typical range thereof is from 0.5 hours to several tens of hours, preferably from about 1 hour to 10 hours.

When the template particles are polymer particles, the third step is unnecessary. That is, by the fourth step of firing the second core/shell particles obtained in the second step, removal of the template particles and firing of the shell can be performed simultaneously. Therefore, the hollow structure particles can be manufactured by only three steps of the first step, the second step, and the fourth step.

The hollow structure particles obtained in the fourth step sometimes contain particles of by-products having non-uniform shape. The proportion of by-product particles is typically 10% or less, preferably 5% or less. Precise control of synthetic conditions and the like can suppress the formation of by-product particles. The rate of particles having a non-uniform shape can be calculated by the number of particles having a non-uniform shape among 100 hollow structure particles randomly photographed by a transmission electron microscope (TEM) or a scanning electron microscope (SEM).

<White Inks>

The white ink according to the present embodiment contains the hollow structure particle according to the present embodiment described above as a coloring agent. The white ink according to the present embodiment can be used as an ink selected from the group consisting of aqueous inks, latex inks, solvent inks, and UV-curable inks. Such various inks can be prepared by appropriately adding components required for the respective inks together with the hollow structure particle as a coloring agent.

[Aqueous Inks]

When the white ink according to the present embodiment is formed into an aqueous ink, it is preferable that the white ink contains water, a dispersant, a water-soluble organic solvent and a surfactant. There is no limitation on the water which can be used, but it is preferable that the water contains few impurities such as inorganic ions. Such water includes ion exchanged water, distilled water and the like.

Examples of the dispersant include copolymers obtained by polymerizing at least two monomers selected from styrene and its derivatives; vinylnaphthalene and its derivatives; aliphatic alcohol esters of $\alpha,\beta$-ethylenically unsaturated carboxylic acids; acrylic acid and its derivatives; maleic acid and its derivatives; itaconic acid and its derivatives; faric acid and its derivatives; vinyl acetate, vinyl alcohol, vinyl pyrrolidone, acrylamide and their derivatives; and the like. Preferably, at least one monomer is a hydrophilic monomer. Types of copolymers include, for example, block copolymers, random copolymers, graft copolymers, salts thereof and the like.

Dispersants may be synthesized or purchased as a commercially available product. Specific examples of the commercially available products include Joncryl 62, 67, 68, 678 and 687, etc. (styrene acrylic resin manufactured by BASF Corporation); Movinyl S-100A (modified vinyl acetate resin manufactured by Hoechst Synthesis Corporation); Jurimer AT-210 (polyacrylic acid ester copolymer manufactured by Nihon Junyaku Co., Ltd); DISPERBYK series (e.g., DISPERBYK-2010) manufactured by BYK Chemie Japan Co., Ltd.; and the like. When a dispersant is synthesized, a dispersant disclosed in WO 2013/115071 is preferably exemplified.

Examples of the water-soluble organic solvent include: C1-C6 alcohols such as methanol, ethanol, propanol, isopropanol, butanol, isobutanol, secondary butanol and tertiary butanol; carboxylic acid amides such as N,N-dimethylformamide and N,N-dimethylacetamide; lactams such as 2-pyrrolidone, N-methyl-2-pyrrolidone and N-methylpyrrolidin-2-one; cyclic ureas such as 1,3-dimethyl imidazolidin-2-one and 1,3-dimethylhexahydropyrimid-2-one; ketones or ketoalcohols such as acetone, 2-methyl-2-hydroxypentan-4-one and ethylene carbonate; cyclic ethers such as tetrahydrofuran and dioxane; C2-C6 diols, or a mono, oligo, or polyalkylene glycol or thioglycol having a C2-C6-alkylene unit, such as ethylene glycol, diethyelen glycol, 1,2-propanediol, 1,3-propanediol, 1,2-butanediol, 1,4-butanediol, 1,2-hexanediol, 1,6-hexanediol, diethylene glycol, triethylene glycol, tetraethylene glycol, dipropylene glycol, polyethylene glycol, polypropylene glycol, thiodiglycol and dithiodiglycol having a molecular weight of 400, 800, 1540 or more; polyols (triols) such as glycerin, diglycerin, hexane-1,2,6-triol and trimethylol propane; dimethylsulfoxide; glycol ethers or glycol ether acetates, such as propylene glycol monomethyl ether, ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, ethylene glycol monomethyl ether propionate, ethylene glycol monoethyl ether propionate, ethylene glycol monobutyl ether propionate, diethylene glycol monomethyl ether propionate, propylene glycol monomethyl ether propionate, dipropylene glycol monomethyl ether propionate, ethylene glycol monomethyl ether butyrate, ethylene glycol monoethyl ether butyrate, ethylene glycol monobutyl ether butyrate, diethylene glycol monomethyl ether butyrate, diethylene glycol monoethyl ether butyrate, diethylene glycol monobutyl ether butyrate, propylene glycol monomethyl ether butyrate and dipropylene glycol monomethyl ether butyrate; and the like.

Examples of the surfactant include known surfactants such as anionic, cationic, nonionic, amphoteric, silicone-based and fluorine-based surfactants. Among these, nonionic surfactants and silicone-based surfactants are preferable, and silicone-based surfactants are more preferable.

Examples of the anionic surfactant include alkylsulfocarboxylic acid salts, α-olefinsulfonic acid salts, polyoxyethylene alkyl ether acetic acid salts, polyoxyethylenealkyl ether sulfuric acid salts, N-acylamino acids or salts thereof, N-acylmethyltaurine salts, alkylsulfuric acid salt polyoxyalkylether sulfuric acid salts, alkylsulfuric acid salt polyoxyethylenealkyl ether phosphoric acid salts, rosin acid soap, castor oil sulfuric acid ester salts, lauryl alcohol sulfate ester salts, alkylphenolic phosphate esters, alkyl phosphates, alkylarylsulfonic acid salts, diethyl sulfosuccinic acid salts, diethylhexyl sulfosuccinic acid salts and dioctylsulfosuccinic acid salts, etc.

Examples of the cationic surfactant include 2-vinylpyridine derivatives and poly-4-vinylpyridine derivatives, etc.

Examples of the nonionic surfacant include: ether-based nonionic surfactants such as polyoxyethylene nonylphenyl ether, polyoxyethylene octylphenyl ether, polyoxyethylene dodecylphenyl ether, polyoxyethylene oleyl ether, polyoxyethylene lauryl ether and polyoxyethylene alkyl ether; ester-based nonionic surfactants such as polyoxyethylene oleate, polyoxyethylene distearate, sorbitan laurate, sorbitan monostearate, sorbitan monooleate, sorbitan sesquioleate, polyoxyethylene monooleate and polyoxyethylene stearate; acetylene glycol (alcohol)-based nonionic surfactants such as 2,4,7,9-tetramethyl-5-decyne-4,7-diol, 3,6-dimethyl-4-octyne-3,6-diol and 3,5-dimethyl-1-hexyn-3-ol, and C2-C4-alkyleneoxy adduct thereof; polyglycol ether-based nonionic surfactants; and the like.

Examples of the amphoteric surfactant include lauryl dimethylamino acetate betaine, 2-alkyl-N-carboxymethyl-N-hydroxyethylimidazolinium betaine, coconut oil fatty acid amide propyldimethylamino acetate betaine, polyoctyl polyaminoethylglycine and imidazoline derivatives, etc.

Examples of the silicone-based surfactant include polyether-modified siloxane and polyether-modified polydimethylsiloxane, etc. Examples thereof include Dynol 960 and Dynol 980, manufactured by Air Products; Silface SAG001, Silface SAG002, Silface SAG003, Silface SAG005, Silface SAG503A, Silface SAG008, Silface SAG009 and Silface SAG010, manufactured by Nisshin Chemical Co., Ltd.; BYK-345, BYK-347, BYK-348, BYK-349 and BYK-3455, manufactured by BYK Chemie Corporation; and the like. Among these, polyether-modified siloxanes known from the BYK series, etc. manufactured by BYK Chemie Corporation are preferable.

Examples of the fluorosurfactant include perfluoroalkyl sulfonic acid-based compounds, perfluoroalkyl carboxylic acid-based compounds, perfluoroalkyl phosphate compounds, perfluoroalkyl ethylene oxide adducts and polyoxyalkylene ether polymer compounds having perfluoroalkyl ether group on its side chain, etc. The fluorosurfactant can be readily purchased from DuPont, Omnova, DIC, BYK Chemie, etc. in a variety of different types of products.

[Latex Inks]

When the white ink according to the present embodiment is formed into a latex ink, it is preferable that the white ink contains water, a water-soluble organic solvent and a resin. The resin in the white ink may also be in the state of an emulsion or suspension. Examples of water and the water-soluble organic solvent include those that are the same as those contained in the aqueous ink.

Examples of the resin include water-soluble vinyl-based resins, acrylic resins, alkyd-based resins, polyester-based resins, phenoxy-based resins, polyolefin-based resins and modified resins thereof. Among these, acrylic resins, water-soluble polyurethane-based resins, water-soluble polyester-based resins, water-soluble acrylic resins, etc. are preferable.

[Solvent Inks]

When the white ink according to the present embodiment is formed into a solvent ink, it is preferable that the white ink contains a dispersant and a non-aqueous organic solvent.

Examples of the dispersant include a Solbin series manufactured by Nissin Chemical Industry Co., Ltd.; Flowlen series manufactured by Kyoei Chemical Co., Ltd.; and an ANTI-TERRA series and a DISPERBYK series manufactured by Byk Chemie Japan Co., Ltd., etc.

Examples of the nonaqueous organic solvent include hydrocarbon-based solvents, ester-based solvents and ketone-based solvents, etc. Examples of the hydrocarbon-based solvent include n-hexane, n-heptane, n-octane, isooctane, cyclohexane, methylcyclohexane, benzene, toluene, o-xylene, m-xylene, p-xylene and ethylbenzene, etc. Examples of the ester-based solvent include propyl formate, n-butyl formate, isobutyl formate, amyl formate, ethyl acetate, n-propyl acetate, isopropyl acetate, n-butyl acetate, isobutyl acetate, sec-butyl acetate, n-amyl acetate, isoamyl acetate, methylisoamyl acetate, sec-hexyl acetate, methyl propionate, ethyl propionate, n-butyl propionate, butyl butyrate, ethyl butyrate, methyl lactate and γ-butyrolactone, etc. Examples of the ketone-based solvent include: methyl ethyl ketone, methyl n-propyl ketone, methyl n-butyl ketone, methyl isobutyl ketone, diethyl ketone, ethyl n-butyl ketone, di-n-propyl ketone and mesityl ketone, etc.

[Ultraviolet Curable Inks]

When the white ink according to the present embodiment is formed into an ultraviolet curable ink, it is preferable that the white ink contains a curable monomer or a curable oligomer and a photo-curing initiator. The white ink may further contain a photo-curing sensitizer.

As used herein, a "curable monomer" refers to a monomer that polymerizes by applying an external stimulus to form a cured product. A "curable oligomer" refers to an oligomer that polymerizes by applying an external stimulus to form a cured resin. Examples of the curable monomer include a low viscosity acrylic monomer of a radical polymerization type; vinyl ethers, an oxetane-based monomer and a cyclic aliphatic epoxy monomer, all of which are cationic polymerization type; and the like. The curable oligomer includes an acrylic oligomer of cationic polymerization type.

Examples of the low-viscosity acrylic monomer include methoxypolyethylene glycol acrylate, phenoxyethylene glycol acrylate, phenoxydiethylene glycol acrylate, phenoxyhexaethylene glycol acrylate, methoxypolyethylene glycol methacrylate, 3-chloro 2-hydroxypropyl methacrylate, β-carboxyethyl acrylate, acryloyl morpholine, diacetone acrylamide, vinylformamide, N-vinylpyrrolidone, neopentyl glycol dimethacrylate 2PO neopentylglycol dimethacrylate, polyethylene glycol diacrylate, ethylene glycol dimethacrylate, polypropylene glycol diacrylate, tetraethylene glycol diacrylate, glycerol dimethacrylate, glycerol acrylate methacrylate, modified epoxidized polyethylene glycol diacrylate, 2-(2-vinyloxyethoxy)ethyl acrylate, ethoxylated trimethylolpropane triacrylate, ethoxylated glycerine triacrylate and EO-modified trimethylolpropane triacrylate, etc.

Examples of the vinyl ether include hydroxybutyl vinyl ether, triethylene glycol divinyl ether, cyclohexanedimethanol divinyl ether, propenyl ether of propylene carbonate, dodecyl vinyl ether, cyclohexanedimethanol monovinyl ether, cyclohexane vinyl ether, diethylene glycol divinyl ether, 2-ethylhexyl vinyl ether, dipropyleneglycol divinyl ether, tripropylene glycol divinyl ether, hexanediol divinyl ether, octadecyl vinyl ether, butanediol divinyl ether, isopropylvinyl vinyl ether, allyl vinyl ether, 1,4-butanediol divinyl ether, nonanediol divinyl ether, cyclohexanediol vinyl ether, cyclohexane dimethanol vinyl ether, triethylene glycol divinyl ether, trimethylolpropane trivinyl ether, pentaerythritol tetravinyl ether, VEEA acrylic acid-2-(2-vinyloxyethoxy)ethyl or VEEM methacrylic acid-2-(2-vinyloxyethoxy)ethyl, etc.

Examples of the oxetane monomer include 3-ethyl-3-hydroxymethyloxetane, 1,4-bis[((3-ethyloxetan-3-yl) methoxy)methyl]benzene, 3-ethyl-3-[(3-ethyloxetan-3-yl) methoxy)methyl]oxetane, 3-ethyl-3-(phenoxymethyl) oxetane, etc.

Examples of the cyclic aliphatic epoxy monomer include Celloxide 2000 and Celloxide 3000 (manufactured by Daicel Corporation); CYRACURE UVR-6015, CYRACURE UVR-6028, CYRACURE UVR-6105, CYRACURE UVR-6128, CYRACURE ERL-4140 and derivatives thereof (manufactured by Dow Chemical Company); DCPD-EP and its derivatives (manufactured by Maruzen Petrochemical Co., Ltd.); and the like.

Examples of the acrylic oligomer include hyperbranched polyester acrylate, polyester acrylate, urethane acrylate and epoxy acrylate, etc.

Examples of the photopolymerization initiator is not particularly limited, and known photopolymerization initiators can be used depending on the purpose. Examples thereof include 2,4,6-trimethylbenzoyl diphenylphosphine oxide, 2,4,6-trimethylbenzoyl phenylethoxyphosphine oxide, bis(2,4,6-trimethylbenzoyl)-phenylphosphine oxide, bis(2,6-dimethoxybenzoyl)-2,4,4-trimethyl-pentylphosphine oxide, 1-hydroxycyclohexyl phenyl ketone (Irgacure 184; manufactured by BASF), 2-hydroxy-2-methyl-[4-(1-methylvinyl)phenyl]propanol oligomer (Esacure ONE; manufactured by Lamberti), 1-[4-(2-hydroxyethoxy)-phenyl]-2-hydroxy-2-methyl-1-propan-1-one (Irgacure 2959; manufactured by BASF), 2-hydroxy-1-{4-[4-(2-hydroxy-2-methyl-propionyl)-benzyl]-phenyl}-2-methyl-propan-1-one (Irgacure 127; manufactured by BASF), 2,2-dimethoxy-2-phenylacetophenone (Irgacure 651; manufactured by BASF), 2-hydroxy-2-methyl-1-phenyl propan-1-one (Dalocure 1173; manufactured by BASF), 2-methyl-1-[4-(methylthio)phenyl]-2-morpholinopropan-1-one (Irgacure 907; manufactured by BASF), 2-benzyl-2-dimethylamino-1-(4-morpholinophenyl)-butan-1-one, 2-chlorothioxanthone, 2,4-dimethylthioxanthone, 2,4-diisopropylthioxantone and isopropylthioxantone, etc.

Among these, 2,4,6-trimethylbenzoyl diphenylphosphine oxide and 1-[4-(2-hydroxyethoxy)-phenyl]-2-hydroxy-2-methyl-1-propan-1-one are preferable from the viewpoints of curability and transparency.

The photopolymerization initiator may be an intramolecular hydrogen abstraction type photopolymerization initiator. Examples of the intramolecular hydrogen abstraction type photopolymerization initiator include oxyphenyl-based photopolymerization initiators such as methyl oxyphenylacetate (Irgacure MBF; manufactured by BASF), a blend of oxyphenylacetic acid 2-[2-oxo-2-phenylacetoxy-ethoxy]-ethyl ester and oxyphenylacetic acid 2-[2-hydroxy-ethoxy]-ethyl ester (Irgacure 754; manufactured by BASF), and the like.

It is also possible to use a photopolymerization initiation assistant such as an amine in combination with the photopolymerization initiator. Examples of the amine include 2-dimethylaminoethyl benzoate, dimethylaminoacetophenone, ethyl p-dimethylaminobenzoate and isoamyl p-dimethylaminobenzoate, etc.

[Preparation Methods, Etc.]

The white ink according to the present embodiment can be prepared by adding the hollow structure particles to a target liquid medium such as water or a non-aqueous solvent and dispersing the hollow structure particles in a known manner. Examples of the dispersing method include a method in which a coloring agent and a dispersant are put in a high-speed agitation homogenizer, a sand mill (bead mill), a roll mill, a ball mill, a paint shaker, an ultrasonic disperser, a microfluidizer, or the like, and dispersing is performed. As an example, when a sand mill is used, beads having a particle diameter of about 0.01 mm to 1 mm can be used, the filling rate of the beads can be appropriately set, and dispersing treatment can be performed.

The dispersion thus obtained may be subjected to operations such as filtration and centrifugation. This operation allows to equalize the size of the particle diameter of the particles contained in the dispersion.

Of all the above-mentioned components, one may be used alone or two or more may be used in combination. In addition, with regard to all the above-mentioned items, etc., a combination between preferable ones is more preferable and a combination between more preferable ones is even more preferable. The same applies to a combination of a preferable one and a more preferable one, as well as a combination of a more preferable one and an even more preferable one, or the like.

<Inkjet Recording Method>

The inkjet recording method according to the present embodiment performs recording by ejecting droplets of the white ink according to the present embodiment described above by using an inkjet printer, so that the droplets are attached to a recording medium. Examples of the method of ink jet printer include a piezo method and a thermal ink jet method, etc. The white ink according to the present embodiment can be used as an ink jet ink based on any method.

Examples of the recording medium include papers, films, fibers, cloths, leathers, ceramics, glasses and metals, etc.

In particular, the white ink according to the present embodiment is useful for recording on a recording material with a low lightness because printing letters on a surface to be printed with a low lightness such as black, etc. results in a recorded material with excellent visibility. In addition, the hiding property can be improved by making the white ink according to the present embodiment attach to a transparent recording medium to form a white base.

EXAMPLES

In the following, the present invention is explained in more detail with reference to the Examples, but the invention is not limited only to the Examples. In the Examples, when the intended amount of a substance was not obtained in one synthesis operation, etc., the synthesis operation, etc. was repeated until the intended amount of the substance was obtained. The primary particle diameter of the hollow structure particle and the inner diameter of the hollow structure were measured using a transmission electron microscope (JEM-2800, manufactured by Nippon Electronics Co., Ltd.). The content of rutile titanium oxide was calculated according to the following equation (1) using a powder X-ray diffractometer (manufactured by Spectris Co., Ltd., X'Pert PRO).

Abbreviations and the like in the following formula (1) have the following meanings.

$F_R$: content of rutile titanium oxide (wt %).
$I_A$ (101): strength of (101) plane of anatase crystal measured by powder X-ray diffractometer.
$I_R$ (110): strength of (110) plane of rutile crystal measured by powder X-ray diffractometer.

$$F_R = \frac{1}{1 + 0.79 \frac{I_A(101)}{I_R(110)}} \quad (1)$$

In the strength test of hollow structure particles, water dispersion turbidity was measured using a color/turbidity simultaneously measuring instrument (COH400 manufactured by Nippon Denshoku Industries Co., Ltd.). The absorbance of a methylene blue aqueous solution in a catalytic test was measured using a spectrophotometer (UV-3150, manufactured by Shimadzu Corporation).

Synthesis Example 1: Preparation of Ethanol Dispersion of Template Particles (Dispersion 1)

To 600 g of distilled water, 13.5 g of styrene, 2.4 g of methacrylic acid and 0.05 g of potassium persulfate were added, and emulsion polymerization was carried out at 80° C. to obtain an aqueous dispersion containing styrene-methacrylic acid polymer particles (template particles). The primary particle diameter of the obtained template particles was 158 nm. Dispersion 1 was prepared by adding ethanol to the aqueous dispersion of the template particles while concentrating the aqueous dispersion in an evaporator, so that water is replaced with ethanol. The content of the template particles in dispersion 1 was 9% by mass.

Synthesis Example 2: Preparation of Ethanol Dispersion of Template Particles (Dispersion 2)

Dispersion 2 was prepared in the same manner as in Synthesis Example 1, except that 13.5 g of styrene used in Synthesis Example 1 was changed to 21 g of styrene. The primary particle diameter of the obtained template particles was 237 nm. The content of the template particles in dispersion 2 was 9 mass %.

Example 1

(Step 1: Obtaining First Core/Shell Particles)

20 g of ethanol, 8 g of acetonitrile, 0.1 g of polyvinylpyrrolidone and 5 g of dispersion 1 were cooled to 10° C. to obtain a liquid. To this liquid, 3 g of titanium tetrabutoxide and 3 g of a 2% aqueous ammonia solution were added every 0.5 hours in three aliquots, and the mixture was reacted at 10° C. for 4 hours to obtain a liquid containing the first core/shell particles. The resulting liquid was used in the next step 2 without isolation or purification.

(Step 2: Obtaining Second Core/Shell Particles)

To the liquid obtained in step 1, 1 g of tetraethyl orthosilicate and 7 g of distilled water were added at 25° C. and reacted at 25° C. for 10 hours to obtain a liquid. The obtained liquid was centrifuged at 15,000 rpm for 25 minutes to remove the supernatant liquid, and the residue was dried in a vacuum dryer heated to 60° C. to obtain 2.0 g of the intended second core/shell particles.

(Step 3: Manufacturing of Hollow Structure Particles)

2.0 g of the second core/shell particles obtained in step 2 was placed on a ceramic board, set in a firing oven, and fired at 800° C. for 1 hour in a hydrogen atmosphere. After replacing the hydrogen atmosphere with an air atmosphere, the second core/shell particles were fired at 1,000° C. for another 1 hour to obtain 0.9 g of hollow structure particles of Example 1 containing titanium oxide and silica.

Example 2

The same procedures were carried out as in Example 1, except that the amount of titanium tetrabutoxide used in step 1 of Example 1, 3 g, was changed to 7 g, to obtain 1.6 g of hollow structure particles of Example 2 containing titanium oxide and silica.

Example 3

The same procedures were carried out as in Example 1, except that the amount of titanium tetrabutoxide used in step 1 of Example 1, 3 g, was changed to 15 g, to obtain 3.2 g of hollow structure particles of Example 3 containing titanium oxide and silica.

Example 4

The same procedures were carried out as in Example 1, except that the amount of titanium tetrabutoxide used in step 1 of Example 1, 3 g, was changed to 1 g, to obtain 0.5 g of hollow structure particles of Example 4 containing titanium oxide and silica.

Example 5

The same procedures were carried out as in Example 1, except that dispersion 1 used in step 1 of Example 1 was changed to dispersion 2, the amount of tetraethyl orthosilicate used in step 2, 1 g, was changed to 0.013 g and the hydrogen atmosphere during firing was changed to an air atmosphere, to obtain 0.6 g of hollow structure particles of Example 5 containing titanium oxide and silica.

Example 6

The same procedures were carried out as in Example 1, except that dispersion 1 used in step 1 of Example 1 was changed to dispersion 2, the amount of titanium tetrabutoxide used, 3 g, was changed to 10 g and the amount of tetraethyl orthosilicate used in step 2, 1 g, was changed to 0.15 g, to obtain 1.9 g of hollow structure particles of Example 6 containing titanium oxide and silica.

Example 7

(Step 1: Obtaining First Core/Shell Particles)
20 g of ethanol, 8 g of acetonitrile, 0.1 g of polyvinylpyrrolidone and 5 g of dispersion 2 were cooled to 10° C. to obtain a liquid. To this liquid, 3 g of titanium tetrabutoxide and 3 g of a 2% aqueous ammonia solution were added every 0.5 hours in three aliquots, and the mixture was reacted at 10° C. for 4 hours to obtain a liquid containing the first core/shell particles. The resulting liquid was used in the next step 2 without isolation and purification.
(Step 2: Obtaining Second Core/Shell Particles)
To the liquid obtained in step 1, 0.1 g of tetraethyl orthosilicate, 0.06 g of zinc chloride and 7 g of distilled water were added at 25° C. and reacted at 25° C. for 10 hours to obtain a liquid. The obtained liquid was centrifuged at 15,000 rpm for 25 minutes to remove the supernatant liquid, and the residue was dried in a vacuum dryer heated to 60° C. to obtain 2.0 g of the intended second core/shell particles.
(Step 3: Manufacturing of Hollow Structure Particles)
2.0 g of the second core/shell particles obtained in step 2 was placed on a ceramic board, set in a firing oven, and fired at 900° C. for 1 hour in an air atmosphere to obtain 0.9 g of hollow structure particles of Example 7 containing titanium oxide and silica.

Example 8

The same procedures were carried out as in Example 7, except that 0.06 g of zinc chloride used in step 2 of Example 7 was changed to 0.07 g of iron(III) chloride, to obtain 0.9 g of hollow structure particles of Example 8 containing titanium oxide and silica.

Example 9

The same procedures were carried out as in Example 1, except that dispersion 1 used in step 1 of Example 1 was changed to dispersion 2 and the amount of tetraethyl orthosilicate used in step 2, 1 g, was changed to 3.2 g, to obtain 1.4 g of hollow structure particles of Example 9 containing titanium oxide and silica.

Comparative Example 1

An attempt was made to obtain hollow structure particles containing titanium oxide and silica by carrying out the same procedures as in Example 1, except that 1 g of tetraethyl orthosilicate and 7 g of distilled water were not added. The obtained particles were randomly photographed 10 times by a transmission electron microscope (TEM), and photographs were confirmed. However, only fused particles in which two or more particles were fused to each other and particles in which hollow structures were collapsed were observed, and no hollow structure particles were observed.

Comparative Example 2

The same procedures were carried out as in Example 1, except that 1 g of tetraethyl orthosilicate and 7 g of distilled water were not added and the firing conditions in step 3 were changed to an air atmosphere, 500° C. and 1 hour, to obtain 0.6 g of hollow structure particles of Comparative Example 2 containing only titanium oxide. The titanium oxide in the resulting hollow structure particle was anatase as described below.

Comparative Example 3

The same procedures were carried out as in Example 1, except that dispersion 1 used in step 1 in Example 1 was changed to dispersion 2 and the hydrogen atmosphere during firing in step 3 was changed to an air atmosphere, to obtain 0.9 g of hollow structure particles of Comparative Example 3 containing titanium oxide and silica. The titanium oxide in the obtained hollow structure particles was a mixed crystal of anatase and rutile as described below.

With regard to the hollow structure particles, etc. obtained in the Examples and the Comparative Examples, Table 1 below shows the content of silica (mass %), primary particle diameter B (nm) of hollow structure particles, inner diameter A (nm) of hollow structure, the ratio thereof A/B, the variation coefficient (%) of primary particle diameter B and the content of rutile titanium oxide $F_R$ (mass %)

TABLE 1

| Physical property | Content of silica (%) | B (nm) | Variation coefficient (%) | A (nm) | A/B | $F_R$ (%) |
|---|---|---|---|---|---|---|
| Example 1 | 30.3 | 215 | 2 | 138 | 0.64 | 100 |
| Example 2 | 15.7 | 278 | 3 | 139 | 0.5 | 100 |
| Example 3 | 8.0 | 393 | 4 | 142 | 0.36 | 100 |
| Example 4 | 56.6 | 183 | 4 | 137 | 0.75 | 100 |
| Example 5 | 0.53 | 295 | 2 | 223 | 0.76 | 100 |
| Example 6 | 1.8 | 452 | 4 | 215 | 0.48 | 100 |
| Example 7 | 3.9 | 300 | 2 | 217 | 0.72 | 100 |
| Example 8 | 3.9 | 305 | 3 | 220 | 0.72 | 100 |

TABLE 1-continued

| Physical property | Content of silica (%) | B (nm) | Variation coefficient (%) | A (nm) | A/B | $F_R$ (%) |
|---|---|---|---|---|---|---|
| Example 9 | 56.7 | 354 | 1 | 225 | 0.64 | 100 |
| Comparative Example 1 | 0 | — | — | — | — | 100 |
| Comparative Example 2 | 0 | 290 | 5 | 220 | 0.76 | 0 |
| Comparative Example 3 | 22.3 | 313 | 1 | 215 | 0.69 | 30.1 |

As is clear from the results of variation coefficient in Table 1, the hollow structure particles of Examples 1 to 9 had a uniform primary particle diameter and the titanium oxide was rutile.

[Strength Test of Hollow Structure Particles]

0.007 g of hollow structure particles manufactured in each of Examples 1, 5 and 8 and Comparative Example 2, was added to 10 mL of distilled water, and subjected to ultrasonic wave treatment in an ultrasonic bath (W-113MkII manufactured by Honda Electronics Co., Ltd.) for 10 minutes to obtain a liquid (prior to the strength test). The obtained liquid and 6 g of zirconia beads with a diameter of 0.03 mm were added to a filmix (RM manufactured by Primix Corporation), and the filmix was operated at a rotation number of 3,000 rpm for 10 minutes to obtain a liquid (post the strength test).

Distilled water was added to the respective liquids obtained prior to and post the strength test, so that the respective liquids were diluted by 10-fold, and turbidity was measured. The turbidity was expressed as a TURB value. The TURB value is a concentration with regard to kaolin-standard solutions. The rate of change in TURB values was calculated according to the following equation, and the intensity of hollow structure particles was judged. The strength test results are shown in Table 2 below. The rate of change in TURB values is shown in Table 2 below as a value obtained by rounding the first decimal place.

Rate of change in TURB value (%)=(TURB value post strength test (mg/L)/TURB value prior to strength test (mg/L)×100

TABLE 2

| Results of strength test | Rate of change in TURB values (%) |
|---|---|
| Example 1 | 69 |
| Example 5 | 48 |
| Example 8 | 78 |
| Comparative Example 2 | 14 |

As is evident from the results of the rate of change in the TURB values in Table 2, the hollow structure particles of Examples 1, 5 and 8 containing titanium oxide and silica had higher values than that of hollow structure particles of Comparative Example 2 containing titanium oxide alone. This is because the hollow structure particles of Examples 1, 5 and 8 maintain the hollow structure in a more satisfactory manner than the hollow structure particles of Comparative Example 2. It should be noted that in Examples 1, 5 and 8, the presence of a large number of hollow structure particles was confirmed even after the strength test, but in Comparative Example 2, hollow structure particles were hardly confirmed post the strength test.

[Catalyst Performance Test]

0.05 g of the hollow structure particles produced in each of Examples 1 and 8 and Comparative Examples 2 and 3 was added to a $1.0 \times 10^{-5}$ M methylene blue aqueous solution, and dispersed in an ultrasonic homogenizer (US-150T manufactured by Nihon Seiki Kaisha Ltd.) for 1 minute. The dispersed dispersion was stirred in the dark for 20 minutes and then irradiated with ultraviolet rays for 50 minutes using an ultraviolet irradiator (UVH-0121C-0801, manufactured by Ushio Electric Co., Ltd.). The dispersion after ultraviolet irradiation was centrifuged in a centrifuge (2420 manufactured by Kubota Corporation) at 4,000 rpm for 30 minutes, and the absorbance of the supernatant liquid was measured in the range of 380 nm to 800 nm. The catalytic performance of the hollow structure particles was evaluated from the maximum absorbance C after the ultraviolet ray irradiation divided by the maximum absorbance $C_0$ before the UV irradiation. The results of the catalyst performance test are shown in Table 3 below. The catalyst performance is shown in Table 3 below, as a value obtained by rounding the third decimal point.

TABLE 3

| Results of catalyst property test | Absorbance $C/C_0$ |
|---|---|
| Example 1 | 0.29 |
| Example 8 | 0.62 |
| Comparative Example 2 | 0.01 |
| Comparative Example 3 | 0.02 |

As is clear from the results of the absorbance $C/C_0$ in Table 3, the catalytic performances of the hollow structure particles of Examples 1 and 8 were inhibited because titanium oxide was rutile.

Example 10

0.07 g of the hollow structure particles prepared in Example 8 and 0.175 g of the dispersant (DISPERBYK-2010, manufactured by BYK Chemie Japan, Inc.) were added to 7 ml of distilled water, and the mixture was added to a filmix (RM manufactured by Primix Corporation) and treated at a rotation number of 10,000 rpm for 10 minutes to obtain a dispersion. 5 g of the obtained dispersion, 0.1 g of 1,2-hexanediol, 0.75 g of resin (S-LEC KW-1, manufactured by Sekisui Chemical Co., Ltd.) and 1.5 g of distilled water were mixed to prepare the white ink of Example 10.

Example 11

The same procedures were carried out as in Example 10, except that the hollow structure particles produced in Example 8 were changed to the hollow structure particles produced in Example 9, to obtain the white ink of Example 11.

Comparative Example 4

The same procedures were carried out as in Example 10, except that the hollow structure particles produced in Example 8 were changed to titanium oxide particles (CR-50-2 manufactured by Ishihara Sangyo Kaisha, Ltd.), to obtain the white ink of Comparative Example 4.

[Hiding Property Test]

To each of the white inks prepared in Examples 10 and 11 and Comparative Example 4, 0.02 g of a silicone-based surfactant (BYK-349, manufactured by BYK-Chemie Japan Co., Ltd.) was added, and the resultant was applied onto a 50 mm×50 mm glass substrate by a spin coater at 400 rpm for 10 seconds, and then dried at 120° C. for 5 minutes to form a film, which was used as a test specimen. The diffuse reflectance of the obtained test specimen was measured by a spectrophotometer (UV-3100 manufactured by Shimadzu Corporation, UV-3100) and the mean reflectance (%) of 380 nm to 780 nm was obtained. The larger the numerical value obtained, the higher the hiding property, exhibiting a better result. The results of the hiding property test are shown in Table 4 below.

[Sedimentation Property Test]

The sedimentation property (μm/s) of each of the white inks prepared in Examples 10 and 11 and Comparative Example 4 was measured using a centrifugal sedimentation type dispersion-stability analyzer (LUMiFuge110 manufactured by Nippon Luft Co., Ltd.). The smaller the numerical value obtained, the better the sedimentation property. The results of the sedimentation property test are shown in Table 4 below.

TABLE 4

| Results of evaluation | Hiding property (%) | Sedimentation property test (μm/s) |
|---|---|---|
| Example 10 | 35 | 4 |
| Example 11 | 31 | 18 |
| Comparative Example 4 | 26 | 51 |

As is clear from the results of the hiding property in Table 4, the white inks of Examples 10 and 11, which contain the hollow structure particles containing titanium oxide and silica, the crystal form of the titanium oxide being rutile, had a better hiding property than the white ink of Comparative Example 4, which contains the hollow structure particles containing titanium oxide and silica, with the crystal form of the titanium oxide being a mixed crystal of anatase and rutile. Additionally, as is clear from the results of sedimentation property test in Table 4, the sedimentation property of the white inks of Examples 10 and 11 was improved as compared to the white ink of Comparative Example 4, and the storage stability was also excellent.

The invention claimed is:

1. A hollow structure particle formed from a mixture of titanium oxide and silica, wherein a content of silica is from 0.1% by mass to 80% by mass based on the content of titanium oxide, and wherein a crystal form of the titanium oxide is rutile.

2. The hollow structure particle according to claim 1, wherein a primary particle diameter B is 10 nm to 1,000 nm.

3. The hollow structure particle according to claim 1, wherein a ratio of inner diameter A of a hollow structure to the primary particle diameter B, A/B, is 0.3 to 0.95.

4. The hollow structure particle according to claim 1, further comprising an element other than titanium oxide and silica.

5. A white ink comprising the hollow structure particle according to claim 1 as a coloring agent.

6. The white ink according to claim 5, wherein the white ink is an ink selected from the group consisting of aqueous inks, latex inks, solvent inks and ultraviolet curable inks.

7. The white ink according to claim 5, wherein the white ink is used in inkjet recording.

8. An inkjet recording method, wherein recording is performed by ejecting droplets of the white ink according to claim 5 using an ink jet printer, so that the droplets are attached to a recording medium.

9. The hollow structure particle according to claim 1, wherein the hollow structure particle consists essentially of the mixture of titanium oxide and silica.

10. A method of producing a hollow structure particle, comprising:
    forming a shell containing a titanium oxide precursor on a surface of a template particle, which becomes a core, to obtain a first core/shell particle;
    applying a silica precursor to a surface of the first core/shell particle to obtain a second core/shell particle; and
    firing the shell particle to obtain a hollow structure particle formed from a mixture of titanium oxide and silica, wherein a content of silica is from 0.1% by mass to 80% by mass based on the content of titanium oxide, and wherein a crystal form of the titanium oxide is rutile.

11. The method of producing the hollow structure particle according to claim 10, further comprising removing the template particle from the second core shell particle to obtain a shell particle after applying the silica precursor to the surface of the first core/shell particle to obtain a second core/shell particle.

12. The method according to claim 11, wherein the template particle is a polymer particle.

13. The method according to claim 11, wherein the template particle is a polymer particle containing styrene as a constituent monomer.

14. The method according to claim 11, wherein the template particle is a styrene-(meth)acrylic acid polymer particle.

15. The method according to claim 11, wherein the step of obtaining the second core/shell particle is performed in the presence of a dispersant.

16. The method according to claim 10, wherein the template particle is a polymer particle.

17. The method according to claim 10, wherein the template particle is a polymer particle containing styrene as a constituent monomer.

18. The method according to claim 10, wherein the template particle is a styrene-(meth)acrylic acid polymer particle.

19. The method according to claim 10, wherein obtaining the second core/shell particle is performed in the presence of a dispersant.

* * * * *